April 20, 1937. M. IRELAND 2,077,627
AUTOMATIC TOASTER
Original Filed June 18, 1934  3 Sheets-Sheet 1

INVENTOR
MURRAY IRELAND
BY Paul, Paul & Moore
ATTORNEYS

April 20, 1937.   M. IRELAND   2,077,627
AUTOMATIC TOASTER
Original Filed June 18, 1934   3 Sheets-Sheet 2
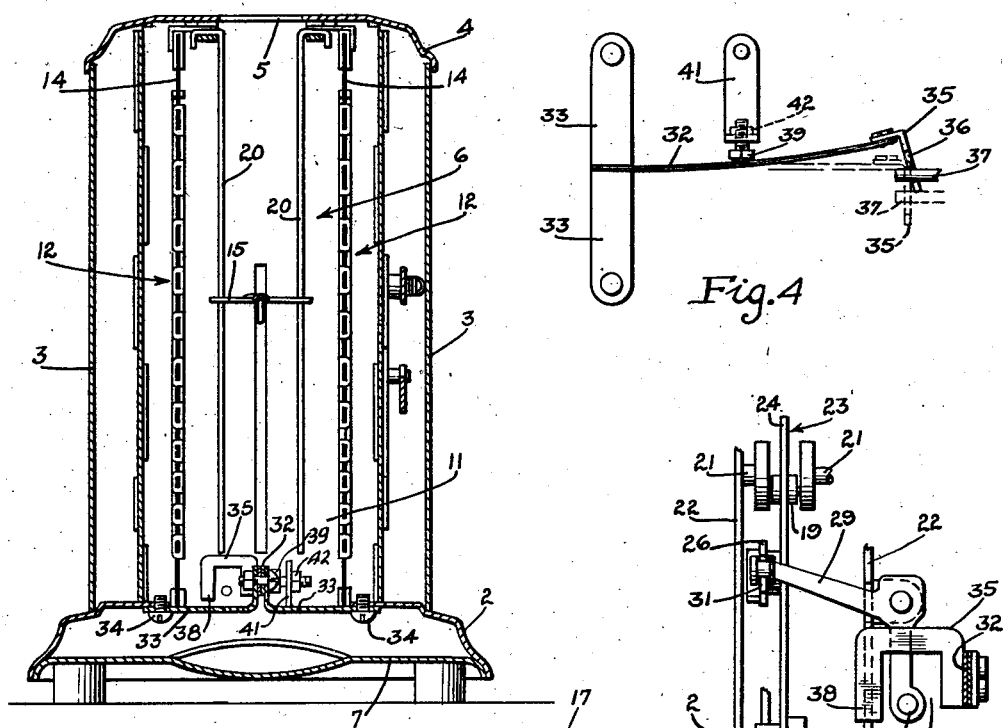
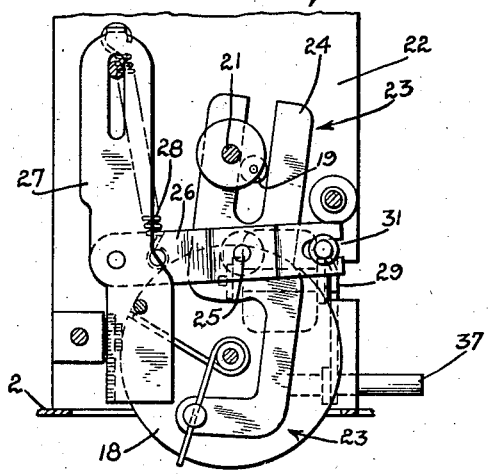
INVENTOR
MURRAY IRELAND
BY Paul, Paul & Moore
ATTORNEYS Patented Apr. 20, 1937

2,077,627

UNITED STATES PATENT OFFICE 2,077,627

AUTOMATIC TOASTER

Murray Ireland, St. Paul, Minn., assignor, by mesne assignments, to McGraw Electric Company, Chicago, Ill., a corporation of Delaware Continuation of application Serial No. 731,065, June 18, 1934. This application May 6, 1935, Serial No. 20,110

5 Claims. (Cl. 219—19)

This application is a continuation of my copending application Serial No. 731,065, filed June 18, 1934.

This invention relates to an improved thermostatic control device, which readily lends itself for use to automatically control the operation of a variable speed motor or timing mechanism, and is particularly well adapted for use in connection with certain types of automatic toasters.

One objection, common to a great many automatic toasters, is that they are difficult to operate in such a manner that all of the bread slices will be uniformly toasted, from the time the toaster is initially started until the required number of slices have been toasted. This difficulty results because of the variation in the temperature of the toasting chamber or oven. In other words, when the toaster is initially started, all the parts of the toaster are cold, and consequently, if a slice of bread is inserted in the toaster when the latter is initially energized, it will require a longer period of time to toast the first slice than will be required for succeeding slices, unless, of course, some auxiliary means is provided for quickly boosting the temperature of the oven when the toaster is started.

The time temperature curve of an electrically heated appliance, such as a toaster, is a relatively complicated curve, the rate of temperature rise being greatest during the initial part of the heating-up period and then gradually decreasing. The shape of the curve is approximately that of an exponential or logarithmic curve, and the provision of a timing mechanism that will automatically compensate for this variable increase is a relatively difficult matter.

An important object of the invention, therefore, is to provide an electric toaster having means therein for automatically varying the length of the toasting periods in accordance with variations in the temperature of the toasting chamber or oven, whereby all of the bread slices will be uniformly toasted, from initial starting of the toaster, as when the heating elements and oven are cold, during heating of and after said oven has attained its maximum temperature.

A further and more specific object of the invention is to provide, in combination with an electric toaster comprising a movable bread carrier, a timing mechanism for automatically moving said carrier into non-toasting position when the bread slice has been properly toasted, and a thermo-responsive device having its free end operatively associated with said timing mechanism and positioned to be influenced by variations in the temperature of the oven, of means associated with said thermo-responsive device and positioned to be engaged thereby, to control the movement of its free end whereby successive toasting periods are progressively shortened from initial starting of the toaster until the oven has attained its maximum heat, whereby all bread slices are uniformly toasted.

Another object of my invention is to provide a thermal control for a timer toaster that shall be so designed and constructed as to prevent overshooting or hunting of a thermally controlled cooking appliance, such as a toaster.

Other objects of the invention reside in the provision of a thermostatic control device comprising a thermo-bar having its free end operatively connected to a member to be actuated, and having an adjustable stop positioned intermediate the ends of said thermo-bar adapted to be engaged thereby, when the latter is flexed, whereby the movement of the free end of said thermo-bar is automatically controlled and made to conform to the varying rate of increase of temperature of the appliance, and in the simple and inexpensive construction of the device, as a whole, whereby it may be manufactured at small cost and be readily embodied in the construction of various types of automatic toasters, and other mechanisms where applicable, to render such toasters and mechanisms more accurate in operation.

The present invention is more particularly adapted for use in connection with a toaster having a variable speed time mechanism for automatically controlling the operation of the heating elements, and having also a temperature responsive device for automatically controlling the operation of said time mechanism in accordance with the temperature conditions of the toaster, which operates to gradually increase the speed of said mechanism from initial starting until the toasting chamber or oven has attained its maximum temperature, whereby the length of successive toasting periods, following initial starting of the toaster, are relatively shortened, until the oven has attained its maximum heat.

Briefly, the invention is applied to a bimetal bar, located to be affected by the temperature variations of the toasting chamber or, more generally, of the toaster itself, having one end fixed and the other end free to move, and comprises an adjustable stop member, located to engage the bimetal bar intermediate its ends, after the bimetal bar has warped or moved through a certain distance by reason of increase of temperature thereof. As the temperature of the oven gradually rises, the temperature responsive device will gradually increase the speed of operation of the time control mechanism, to thereby automatically successively shorten the toasting periods in accordance with the temperature rise of the appliance, until the oven has attained the desired toasting temperature, after which the temperature responsive device becomes ineffective to further increase the speed of the time control mechanism, and remains in such condition as long as the toaster is in continual use. Should the operation of the toaster, however, be temporarily interrupted for a period of sufficient length to allow the oven to relatively cool, then the temperature responsive device will automatically prolong the next toasting period in proportion to the drop in the temperature of the oven, whereby succeeding slices will be uniformly toasted, regardless of toaster interruptions.

Other objects of the invention will appear from the following description and accompanying drawings and will be pointed out in the annexed claims.

In the accompanying drawings there is disclosed a structure designed to carry out the various objects of the invention, but it is to be understood that the invention is not confined to the exact features shown as various changes may be made within the scope of the claims which follow.

In the drawings:

Fig. 3 is a vertical cross-sectional view on the line 3—3 of Fig. 1, with some of the parts omitted, showing the thermostatic control device mounted in the lower portion of the toaster oven;

Fig. 4 is a fragmentary detail view showing the thermo-bar in its actuated position and engaging the stop;

Fig. 5 is a detail sectional view showing the speed control member of a variable speed clock;

Fig. 6 is a detail sectional view showing the lost motion connection between the thermo-bar and the speed control member of the timing mechanism;

Figure 1:
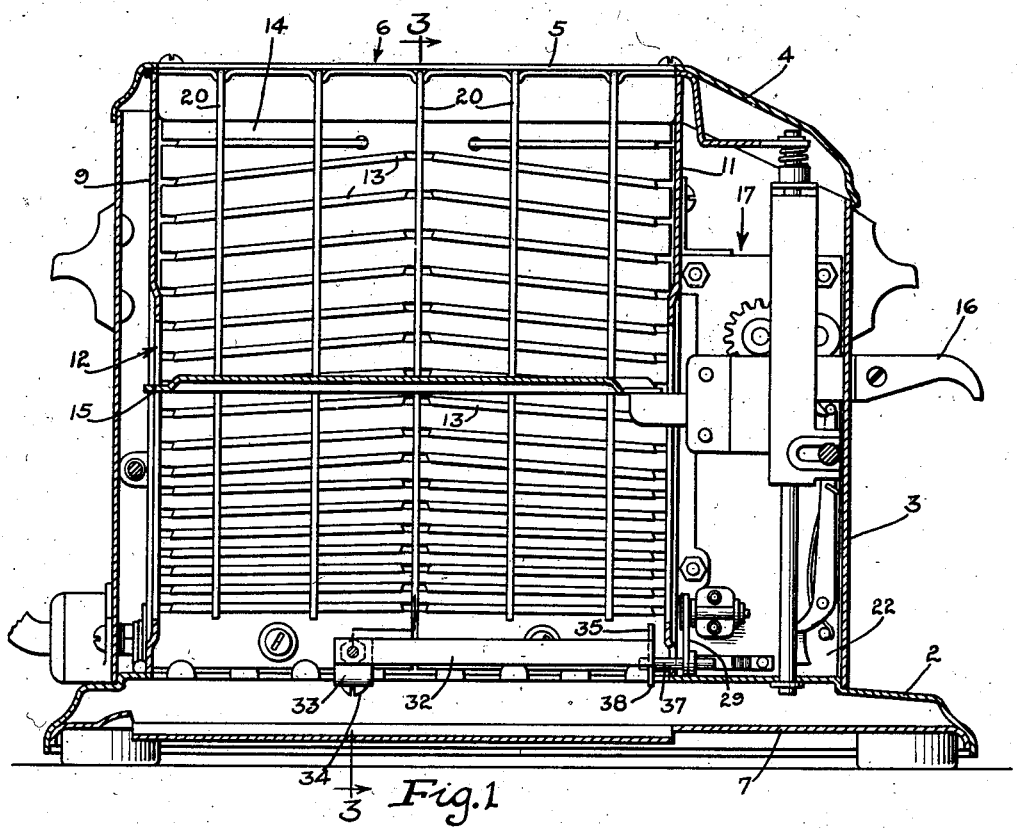
Figure 1 is a vertical longitudinal sectional view of a toaster, showing the invention embodied in the construction thereof.

In the selected embodiment of the invention here shown, there is illustrated in Figs. 1, 2, 3 and 7, for purposes of disclosure, an automatic electric toaster, such as disclosed in my co-pending application, Serial No. 437,071, filed March 19, 1930, and comprising a base 2, shown formed of sheet metal and having an outer casing, generally indicated by the numeral 3, suitably mounted thereon. A top plate 4 is secured to the upper portion of the casing 3, and has therein an elongated opening or slot 5, which communicates directly with the oven or heating chamber 6, best shown in Fig. 3. A bottom plate 7 is removably secured to the base 2, and normally conceals the automatic control device.

The oven or toasting chamber is defined by the bottom plate 7, end walls 9 and 11, and the heating elements, generally indicated by the numeral 12, and which include the resistance wires 13 and the mica plates 14, upon which said wires are secured. Guide wires 20 are arranged within the oven 6, and are spaced inwardly from the heating elements 12 to prevent the bread from contacting directly therewith.

A bread carrier 15 is mounted within the oven and has a handle 16 conveniently located at the front of the toaster, whereby said bread carrier may be conveniently moved into toasting position within the oven. This handle is also operatively associated with a time control mechanism, comprising a variable speed clock mechanism, generally indicated by the numeral 17 in Fig. 1. This clock mechanism is shown in detail in my co-pending application, above mentioned, and it will therefore be unnecessary to herein describe the same in detail, it being understood that it forms no part of the present invention. The clock mechanism 17 is reset or wound each time the handle 16 is depressed to move the bread carrier into toasting position, and after a predetermined time interval said clock mechanism will cause the release of the carrier, whereby it is returned to non-toasting position by suitable means, not shown, such as a spring. Depression of the handle 16 also effects closing of the main control switch of the toaster, as will be set forth in detail hereinafter.

The time control mechanism 17 is partially shown in Fig. 5, and comprises a balance wheel 18 and a crank pin 19, provided upon a shaft 21 rotatably supported in suitable bearings in the frame 22 of the mechanism. The time control mechanism herein disclosed is of the variable speed type and comprises an oscillator 23 having a forked end 24 engaging the crank pin 19.

The oscillator 23 is pivotally supported upon a pin 25 secured to an arm 26 having one end pivotally connected to a member 27 mounted for vertical adjustment within the frame 22 of the timing mechanism. A spring 28 is shown having one end connected to the arm 26 and its opposite end to the upper end of the member 27, whereby the arm 26 is normally retained in the position shown in Fig. 5.

A bell crank 29 is pivotally mounted upon one of the side plates of the frame 22 of the timing mechanism, and has one end received in a slot 31 provided in the swinging end of the arm 26, as best shown in Fig. 5, whereby when the bell crank 29 is moved, the arm 26 will be moved to thereby relatively change the position of the oscillator 23 with respect to the crank pin 19 and the balance wheel 18, whereby the speed of the time control mechanism is varied.

Figure 2:
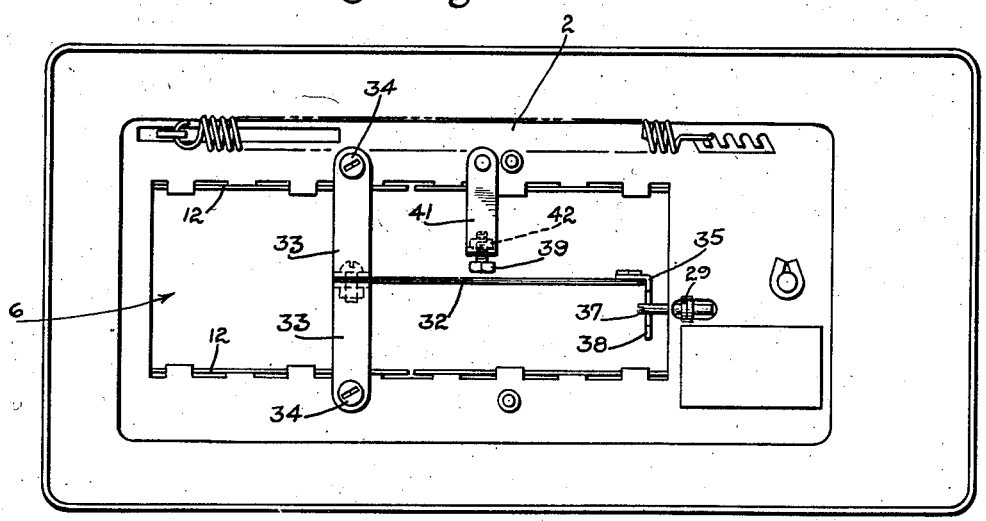
Fig. 2 is a bottom view of Figure 1, with the bottom plate removed, showing the thermo-bar in its normal position, as when the toaster is cold, and also showing the position of the adjustable stop for controlling the warping of the thermo-bar.

A thermo-bar 32 is shown mounted in the lower portion of the oven 6, and has one end suitably secured to brackets 33 which, in turn, are secured to the upper wall of the base 2 by suitable screws 34, as best shown in Figs. 2 and 3. The free end of the thermo-bar 32 has an inverted U-shaped head 35, offset from the medial plane thereof, as shown in Figs. 2 and 6, whereby an opening 36 is provided therein adapted to receive a pin 37 provided at the opposite end of the bell crank 29.

The opening 36 in the head 35 of the thermo-bar is relatively larger than the diameter of the pin 37, so that the thermo-bar may warp slightly before the leg 38 of the head 35 engages the pin 37 and actuates the bell crank. In other words, a lost motion connection is provided between the thermo-bar 32 and the pin 37 of the bell crank 29. It is to be understood that when the toaster is cold, and the thermo-bar 32 is in the position shown in Fig. 2, the oscillator 23 will be in its uppermost position, as shown in Figs. 5 and 6, whereby the timing mechanism will be operating at low speed.

As the temperature of the oven or toasting chamber 6 rises, subsequent to the initial starting of the toaster, the thermo-bar 32 will warp in a direction to cause the leg 38 of the head 35 to engage the pin 37, and thereby move the bell crank 29, whereby the oscillator 23 is moved downwardly to thereby automatically increase the speed of the timing mechanism. As the temperature of the toasting chamber continues to rise, the thermo-bar will continue to warp and increase the speed of the timing mechanism until the oven attains its maximum heat.

My invention resides in the provision of means for retarding the action of the thermo-bar 32 when the toaster is initially started, whereby the first toasting period will be sufficiently prolonged to assure that the first slice will be properly toasted, and also whereby succeeding toasting periods will be progressively shortened, until the toasting chamber or oven has attained its maximum heat or temperature, thereby assuring that all slices will be uniformly toasted, regardless of toasting interruptions.

Such means is clearly illustrated in Figs. 2 and 4, and comprises a stop member or screw 39, positioned to be engaged by an intermediate portion of the thermo-bar 32. The stop 39 is shown adjustably secured to a bracket 41, suitably secured to the top wall of the base 2 by such means as rivets. In the form of the invention herein disclosed, the stop screw 39 is received in threaded engagement with the bracket 41 and has a lock nut 42 for securing it in adjusted position.

Figure 7:
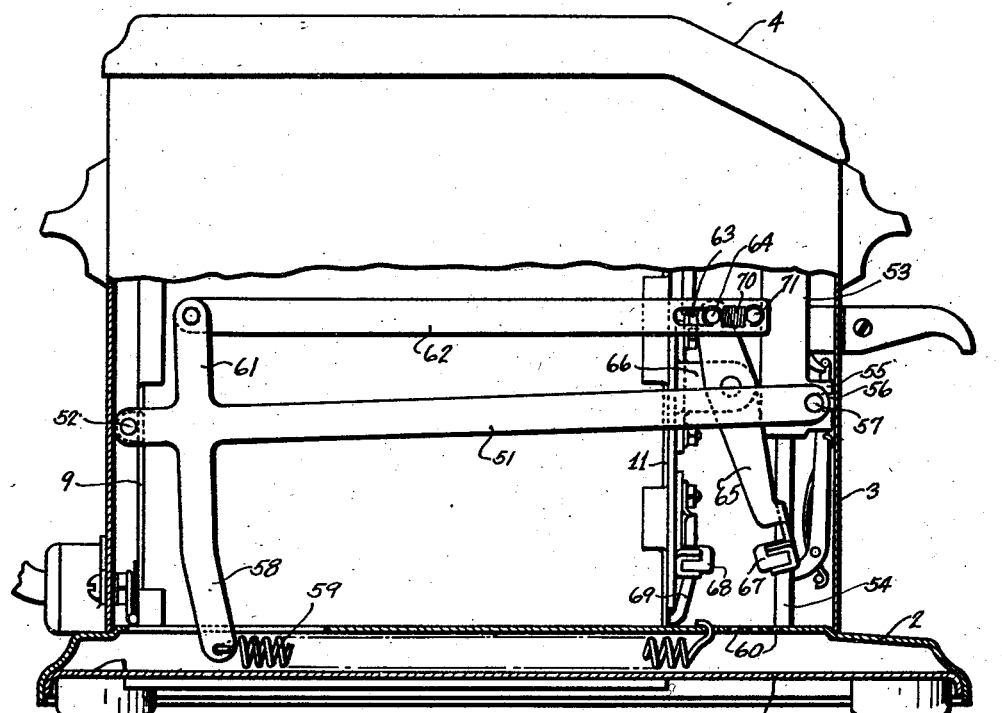
Fig. 7 is a view, partially in side elevation, with parts broken away, and showing particularly the control switch for the heating elements.

The mechanism controlled by the timer will now be described, with particular reference to Figs. 1 and 7, in connection with which it has already been stated that the bread carrier is returned to its non-toasting position and that the heating elements are deenergized.

When the handle 16 is moved downwardly it actuates a lever arm 51, extending from back to front of the toaster structure and pivotally mounted on a transversely extending shaft 52 supported by the rear end wall 9. The handle 16 is secured to a frame 53 vertically slidable on an upright rod 54, the frame 53 having a lug 55 with a recess 56 therein to receive a pin 57 fixed in the end of the arm 51.

The lever arm 51 has two lateral extensions near its pivot end, a lower extension 58 having its free end connected to one end of a tension spring 59, located beneath the base 2, the other end of spring 59 being hooked in any one of a number of recesses 60 in the forward end of the base, the upper extension 61 having pivotally secured thereto one end of a link 62. The forward end of link 62 has a slot 63 therein to receive a pin 64 fixed in the upper end of a contact arm 65, which is pivotally mounted, intermediate its ends on a bracket 66, secured to the front wall 11. A carbon contact member 67 is associated with the arm 65, at its lower end and cooperates with a fixed contact member 68, supported by front wall 11, to control the energization of the heating elements 12, a supply circuit conductor 69 being shown in Fig. 7. A spring 70 connects pin 64 on arm 65 with a pin 71 on link 62 to ensure close operative engagement of the carbon contact members 67 and 68 without mechanically stressing the arm 65.

It will be evident that spring 59 tends to hold the bread carrier 15 in its upper or non-toasting position and also tends to hold the switch arm 65 in its open position and to return these parts to their inoperative positions as soon as permitted to do so, after having been moved to their respective operative positions by downward movement of handle 16.

Let it be assumed that it is desired to toast a number of slices of bread in close succession in a toaster of this kind, starting with the toaster structure at room temperature. It is obvious that some of the heat generated in the heating elements 12 will be used in heating up the toaster structure, and a time temperature curve of this kind is shown at 73 in Fig. 8 of the drawings. It is also obvious that a longer time will be required to toast a slice of bread to a desired degree starting with a cold device, than would be required if the toaster were warm or hot. We may indicate the time required to properly toast the first slice by the line 74 in Fig. 8, the temperature of the structure at the end of the first toasting operation being indicated by the point 75.

Figure 8:
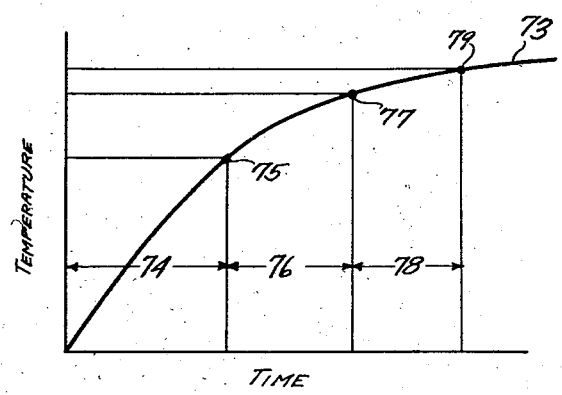
Fig. 8 is a curve showing the temperature rise of a toaster embodying my invention.

If now a second slice of bread is to be toasted immediately after the first slice has been removed, the toaster will start at substantially the temperature indicated by the point 75, so that a somewhat shorter time will be required to properly toast the second slice which time may be indicated by the line 76 in Fig. 8. The temperature of the toaster will rise to the value indicated by the point 77 on curve 73.

If now a third successive slice of bread be toasted, a still shorter length of time 78 will be required and the temperature may rise to the value indicated by the point 79, which is substantially the maximum temperature of the toaster structure. In other words, the time of succeeding toasting operations may be slightly less than the time for the third operation indicated by 78, but there will be no great change or decrease in the time required to toast additional slices of bread to the same degree as the first ones.

While I have described the timing mechanism as being a variable speed one, it is to be understood that it will operate for similar lengths of time in succession, if actuated by the handle 16 and if no controlling effect is applied thereto, and that the desired controlling effect is exercised by the thermo-bar 32, in a manner now to be described in detail.

The thermo-bar 32 is relatively heavy and therefore has an appreciable thermal mass, so that it will move a relatively small distance only during the first few seconds of the first cycle of operation, but as it is subjected to the radiant heat of the heating elements its temperature rise is quite rapid and if there were no lost motion connection between it and the timer operation modifying means, overshooting would occur, that is the timing mechanism would be speeded up to too great a degree and the first slice of bread would not be toasted to the desired degree of brownness. Hence the lost motion connection provided by the slot or opening 36 and the pin 37 is one means for ensuring that no over-shooting can occur.

If now a second slice of bread is to be toasted immediately after the first one has been removed, the toaster temperature increases, but not at its original rate, the bar 32 continues to warp or bend and engages the stop 39 so that its effective movement, that is the operative movement of the free end is reduced, and the design and construction of the bimetal bar 32, and the location and adjustment of the stop member 39, are such that the timing mechanism is speeded up by the action of the bar 32 thereon to reduce the time of successive later operations to a lesser degree than at the lower temperature ranges and substantially in accordance with the upper part of curve 73, which upper part has a lesser rate of rise than the lower part.

It is possible to so correlate all of the design and operating constants of the thermal control element, and of the other parts of the toaster structure, that the timing device will operate at a constant relatively slow speed during the first cycle of operation, that is, the wall of slot 36 just engages pin 37 when the first slice of bread is properly toasted, and that the intermediate part of the bar 32 engages stop 39 at the end of the second cycle, but I do not wish to be understood as stating that this is actually the case in the devices now being built.

It is obvious that more than one stop member 39 may be employed, so that a much greater degree of approximation between the temperature of the toaster and the speed of the timing mechanism can be obtained. It will be understood also that the particular location of the stop member relatively to the free end of the thermo-bar, will also directly affect the movement of the free end thereof.

Therefore, by the provision of the stop member 39 in connection with the thermo-bar 32, the toaster is rendered fully automatic, and a plurality of slices of bread will be uniformly toasted from initial starting of the toaster, until the desired quantity of toast has been prepared. This, as hereinbefore stated, is because of the fact that the first slice of toast is retained in the toasting chamber for a relatively longer period of time than the next following slice, and as each succeeding slice is inserted into the toaster, the time interval allowed to complete the toasting operation will automatically decrease in length, substantially according to the curve 73, until the toasting chamber attains its maximum temperature after which the thermo-bar will be held in contact with the stop member 39, as long as the toaster is in continuous use. Should the toasting operation be temporarily interrupted so that the temperature of the toasting chamber or oven will drop, then the thermostatic control device will again become operative to automatically variably control the operation of the time control mechanism 17, until the temperature of the oven has been restored to its maximum heat.

I claim as my invention:

1. In an automatic toaster comprising a heating element, means for supporting a slice of bread in position to be toasted by heat from the heating element, means for terminating the toasting operation and a variable speed clock mechanism for controlling the terminating means; a bimetal bar in the toaster having a free end operatively connected to the clock mechanism to regulate the speed thereof and stop means initially out of engagement with and in the path of travel of the bimetal bar upon rising temperature to reduce its control effect on the clock mechanism when the toaster is operating at substantially its maximum operating temperature to ensure uniform toasting of successive slices of bread placed in the toaster, irrespective of temperature changes therein.

2. In an automatic toaster comprising a heating element, means for supporting a slice of bread in position to be toasted by heat from the heating element, means for terminating the toasting operation and a variable speed clock mechanism controlling the terminating means, a bimetal bar supported at one end thereof in the toaster and having its other end operatively connected with the clock mechanism to regulate the speed thereof and a stop member located in the path of travel of a predetermined part of the bimetal bar upon rising temperature to reduce the travel of the free end of the bar with increase of temperature to ensure uniform toasting of successive slices of bread placed in the toaster.

3. In an automatic toaster comprising a casing, a heating element therein, means supporting a slice of bread in position to be toasted by said heating element, means for terminating the toasting operation and a variable speed clock mechanism for controlling the terminating means, a bimetal bar located in the toaster supported at one end and having the other end loosely operatively connected to the clock mechanism to regulate the speed thereof, a stop member located adjacent to the bimetal bar, initially out of engagement therewith and in the path of travel of an intermediate portion of the bimetal bar upon rising temperature to reduce the travel of the free end of the bar with increase of toaster temperature to ensure uniform toasting of successive slices of bread placed in the toaster and means to vary the position of the stop member laterally of the bimetal bar to vary the temperature at which the reduction of travel of the free end of the bimetal bar begins.

4. In an automatic toaster comprising a heating element and means including a clock mechanism for determining the length of time of a toasting operation, a bimetal bar in the toaster having one end free to move in response to temperature variations of the toaster, means operatively connecting the movable end of the bar with the clock mechanism to effect control of the speed thereof, and a stop screw initially out of engagement with the bimetal bar, located in the path of travel of an intermediate portion thereof upon rising temperature to reduce the travel of the free end of the bar with increase in toaster temperature to ensure that the clock speed shall be such as to time the toasting operation to ensure uniform toasting of successive slices of bread placed in the toaster.

5. In an automatic toaster comprising a heat-element and means including a clock mechanism for determining the length of time of a toasting operation, a bimetal bar in the toaster having one end free to move in response to temperature variations of the toaster, means operatively connecting the movable end of the bimetal bar with the clock mechanism to effect control of the speed thereof and a stop screw in the path of travel of an intermediate portion of the bimetal bar and engaging the same at a predetermined adjustable temperature to cause the movement of the free end of the bar to be less than proportional to the temperature rise of the toaster to ensure that the clock speed shall be such as to time successive toasting operations to ensure uniform toasting of successive slices of bread placed in the toaster.

MURRAY IRELAND.